US009634344B2

(12) United States Patent
Kusuyama et al.

(10) Patent No.: US 9,634,344 B2
(45) Date of Patent: Apr. 25, 2017

(54) HYDROGEN PURIFIER, HYDROGEN GENERATION APPARATUS, AND FUEL CELL SYSTEM

(71) Applicant: PANASONIC CORPORATION, Osaka (JP)

(72) Inventors: Takahiro Kusuyama, Osaka (JP); Hidenobu Wakita, Kyoto (JP); Chie Harada, Osaka (JP); Seiji Fujihara, Osaka (JP); Tomoyuki Nakajima, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 174 days.

(21) Appl. No.: 14/384,376

(22) PCT Filed: Mar. 7, 2013

(86) PCT No.: PCT/JP2013/001429
§ 371 (c)(1),
(2) Date: Sep. 10, 2014

(87) PCT Pub. No.: WO2013/150717
PCT Pub. Date: Oct. 10, 2013

(65) Prior Publication Data

US 2015/0044583 A1 Feb. 12, 2015

(30) Foreign Application Priority Data

Apr. 6, 2012 (JP) ................................. 2012-087652

(51) Int. Cl.
*H01M 8/06* (2016.01)
*H01M 8/0668* (2016.01)
(Continued)

(52) U.S. Cl.
CPC ............. *H01M 8/0668* (2013.01); *C01B 3/58* (2013.01); *C01B 3/583* (2013.01);
(Continued)

(58) Field of Classification Search
CPC ............. H01M 8/0618; H01M 8/0662; H01M 8/0668; H01M 2208/1095; H01M 2250/20; H01M 2250/30; C01B 3/58; C01B 3/583
See application file for complete search history.

(56) References Cited

U.S. PATENT DOCUMENTS 5,906,803 A * 5/1999 Leppalahti ............... C10K 1/34 423/235
2010/0040915 A1 2/2010 Wakita et al.

FOREIGN PATENT DOCUMENTS

EP 2546913 A1 1/2013
JP 2003-031247 A 1/2003
(Continued)

OTHER PUBLICATIONS

Extended European Search Report for corresponding European Patent Application No. 13772917.4 dated Mar. 25, 2015.
(Continued)

*Primary Examiner* — Jayne Mershon
(74) *Attorney, Agent, or Firm* — McDermott Will & Emery LLP

(57) ABSTRACT

A hydrogen purifier includes: a CO remover configured to reduce carbon monoxide in a hydrogen-containing gas through an oxidation reaction, the hydrogen-containing gas containing ammonia and carbon monoxide; and an ammonia remover provided upstream from the CO remover, the ammonia remover being configured to cause a reaction between ammonia in the hydrogen-containing gas and oxygen by using a catalyst to decompose the ammonia.

6 Claims, 5 Drawing Sheets

100

HYDROGEN-CONTAINING GAS → 1 → 2 → HYDROGEN-CONTAINING GAS 5A 3 5B

(51) Int. Cl.

| | |
|---|---|
| ***C01B 3/58*** | (2006.01) |
| ***H01M 8/0662*** | (2016.01) |
| ***H01M 8/0612*** | (2016.01) |
| *H01M 8/1018* | (2016.01) |

(52) U.S. Cl.

CPC ....... *H01M 8/0618* (2013.01); *H01M 8/0662* (2013.01); *C01B 2203/0233* (2013.01); *C01B 2203/0244* (2013.01); *C01B 2203/0283* (2013.01); *C01B 2203/044* (2013.01); *C01B 2203/047* (2013.01); *C01B 2203/0435* (2013.01); *C01B 2203/0465* (2013.01); *C01B 2203/066* (2013.01); *H01M 2008/1095* (2013.01); *H01M 2250/20* (2013.01); *H01M 2250/30* (2013.01); *Y02B 90/18* (2013.01); *Y02T 90/32* (2013.01)

(56) References Cited

FOREIGN PATENT DOCUMENTS

| | | | |
|---|---|---|---|
| JP | 2010-285595 | A | 12/2010 |
| JP | 2012-046395 | A | 3/2012 |
| WO | 96/11243 | A1 | 4/1996 |
| WO | 2010/116874 | A2 | 10/2010 |

OTHER PUBLICATIONS

International Search Report issued in International Application No. PCT/JP2013/001429 with Date of mailing May 14, 2013, with English Abstract.

* cited by examiner

HYDROGEN PURIFIER, HYDROGEN GENERATION APPARATUS, AND FUEL CELL SYSTEM

RELATED APPLICATIONS

This application is the U.S. National Phase application under 35 U.S.C. §371 of International Application No. PCT/JP2013/001429, filed on Mar. 7, 2013, which in turn claims the benefit of Japanese Application No. 2012-087652, filed on Apr. 6, 2012, the disclosures of which Applications are incorporated by reference herein.

TECHNICAL FIELD

The present invention relates to hydrogen purifiers, hydrogen generation apparatuses, and fuel cell systems.

BACKGROUND ART

Conventionally, fuel cell co-generation systems with high power generation efficiency and high overall efficiency (hereinafter, simply referred to as "fuel cell systems") have been drawing attention as distributed power generators that make efficient energy utilization possible.

A fuel cell system includes a fuel cell as the main body of its power generating part. Examples of the fuel cell include a phosphoric acid fuel cell, a molten carbonate fuel cell, an alkaline fuel cell, a polymer electrolyte fuel cell, and a solid oxide fuel cell. Among these fuel cells, the operating temperature of a phosphoric acid fuel cell or a polymer electrolyte fuel cell (abbreviated as "PEFC") during a power generation operation is relatively low. Therefore, these fuel cells are suitably used for forming fuel cell systems. In particular, electrocatalyst degradation of a polymer electrolyte fuel cell is less than that of a phosphoric acid fuel cell. In addition, electrolyte dissipation does not occur in a polymer electrolyte fuel cell. Therefore, in particular, polymer electrolyte fuel cells are suitably applied in handheld electronic devices and electric automobiles, for example.

In most fuel cells, for example, in a phosphoric acid fuel cell or a polymer electrolyte fuel cell, hydrogen is used as a fuel in a power generation operation. However, usually, means for supplying hydrogen necessary in the power generation operation of such a fuel cell is not developed as an infrastructure. For this reason, in order to obtain electric power by means of a fuel cell system including a phosphoric acid fuel cell or a polymer electrolyte fuel cell, it is necessary to generate hydrogen as a fuel at the installation location of the fuel cell system. Therefore, in conventional fuel cell systems, it is often the case that a fuel cell is installed together with a hydrogen generation apparatus. In the hydrogen generation apparatus, a hydrogen generation method, for example, a steam reforming method, is used to generate a hydrogen-containing gas. In the steam reforming method, a hydrocarbon-based raw material such as natural gas, propane gas, naphtha, gasoline, or kerosene (i.e., a raw material gas) is mixed with water, or alternatively, an alcohol-based raw material such as methanol is mixed with water. The mixture is supplied to a reformer including a reforming catalyst. In the reformer, a steam reforming reaction progresses, and thereby a hydrogen-containing gas is generated.

The hydrogen-containing gas, which is generated by the reformer of the hydrogen generation apparatus with the steam reforming method, contains carbon monoxide (CO) generated as a by-product. For example, the hydrogen-containing gas generated by the reformer of the hydrogen generation apparatus contains carbon monoxide in a concentration of about 10 to 15%.

The carbon monoxide contained in the hydrogen-containing gas significantly poisons the electrocatalyst of a polymer electrolyte fuel cell. The poisoning of the electrocatalyst causes significant degradation in the power generation performance of the polymer electrolyte fuel cell. Therefore, in conventional hydrogen generation apparatuses, it is often the case that the reformer generating the hydrogen-containing gas is installed together with a CO reducer in order to sufficiently reduce the carbon monoxide concentration in the hydrogen-containing gas. The CO reducer reduces the carbon monoxide concentration in the hydrogen-containing gas generated by the reformer to 100 ppm or lower, and preferably, 10 ppm or lower. The hydrogen-containing gas from which carbon monoxide has sufficiently been removed is supplied to the fuel cell of the fuel cell system during a power generation operation. In this manner, poisoning of the electrocatalyst in the polymer electrolyte fuel cell can be prevented.

It should be noted that, usually, the CO reducer included in the hydrogen generation apparatus includes a shift converter. The shift converter is configured to cause a water gas shift reaction catalyzed by a shift conversion catalyst disposed inside the shift converter, thereby generating hydrogen and carbon dioxide from carbon monoxide and steam. The CO reducer further includes a purifier positioned downstream from the shift converter, the purifier including at least one of an oxidation catalyst and a methanation catalyst. The oxidation catalyst causes an oxidation reaction between oxygen in air and carbon monoxide to progress. The methanation catalyst causes a methanation reaction of carbon monoxide to progress. By means of the shift converter and the purifier, the carbon monoxide concentration in the hydrogen-containing gas generated by the reformer is reduced to 100 ppm or lower.

Natural gas supplied to the reformer of the hydrogen generation apparatus as the raw material usually contains a trace amount of nitrogen. The nitrogen content in the natural gas varies depending on, for example, the area where the natural gas is supplied. During a power generation operation of the fuel cell system, there is a case where when the natural gas containing nitrogen is supplied to the reformer of the hydrogen generation apparatus, a chemical reaction between hydrogen generated through a steam reforming reaction and nitrogen is catalyzed by a reforming catalyst included in the reformer, and thereby ammonia is generated. Ammonia is a chemical agent that causes significant degradation in the power generation performance of the polymer electrolyte fuel cell. In addition, ammonia may poison the oxidation catalyst provided in the purifier depending on the type of the catalyst. The poisoning of the oxidation catalyst by ammonia causes significant degradation in the carbon monoxide removing performance of the purifier. This causes poisoning, by carbon monoxide, of the electrocatalyst in the polymer electrolyte fuel cell. Here, the poisoning of the electrocatalyst by carbon monoxide causes more significant degradation in the power generation performance of the polymer electrolyte fuel cell as compared to the power generation performance degradation caused by ammonia. Therefore, removing ammonia from the hydrogen-containing gas by means of an ammonia remover before supplying the hydrogen-containing gas to the polymer electrolyte fuel cell is not enough to stably obtain electric power from the fuel cell system, and it is necessary to suppress the significant power generation performance degradation that is caused by the poisoning of the oxidation catalyst by ammonia.

In this respect, there is a proposed hydrogen generation apparatus that is configured to perform a regeneration operation in accordance with the progress of oxidation catalyst degradation caused by ammonia (see Patent Literature 1, for example).

CITATION LIST

Patent Literature

PTL 1: International Publication No. WO 2007/081016

SUMMARY OF INVENTION

Technical Problem

However, the hydrogen generation apparatus disclosed in Patent Literature 1 is not intended to suppress the progress of the oxidation catalyst degradation caused by ammonia.

The present invention has been made in view of the above-described problems. An object of the present invention is to provide a hydrogen purifier, a hydrogen generation apparatus, and a fuel cell system, which are capable of suppressing the progress of poisoning by ammonia compared to conventional art.

Solution to Problem

In order to solve the above-described problems, a hydrogen purifier according to one aspect of the present invention includes: a CO remover configured to reduce carbon monoxide in a hydrogen-containing gas through an oxidation reaction, the hydrogen-containing gas containing ammonia and carbon monoxide; and an ammonia remover provided upstream from the CO remover, the ammonia remover being configured to cause a reaction between ammonia in the hydrogen-containing gas and oxygen by using a catalyst to decompose the ammonia.

A hydrogen generation apparatus according to another aspect of the present invention includes: the above hydrogen purifier; and a reformer configured to generate the hydrogen-containing gas by using a reaction gas containing a raw material gas. The reaction gas contains at least one of a nitrogen gas and a nitrogen-containing compound.

A fuel cell system according to yet another aspect of the present invention includes: the above hydrogen generation apparatus; and a fuel cell configured to generate electric power by using the hydrogen-containing gas that is supplied from the hydrogen generation apparatus.

Advantageous Effects of Invention

According to one aspect of the present invention, the progress of poisoning by ammonia can be suppressed compared to conventional art.

DESCRIPTION OF EMBODIMENTS

Embodiment 1

A hydrogen purifier according to Embodiment 1 includes: a CO remover configured to reduce carbon monoxide in a hydrogen-containing gas through an oxidation reaction, the hydrogen-containing gas containing ammonia and carbon monoxide; and an ammonia remover provided upstream from the CO remover, the ammonia remover being configured to cause a reaction between ammonia in the hydrogen-containing gas and oxygen by using a catalyst to decompose the ammonia.

According to the above configuration, the progress of poisoning by ammonia can be suppressed compared to conventional hydrogen purifiers. For example, catalyst degradation of the CO remover due to ammonia can be suppressed, and a carbon monoxide concentration can be reduced.

The catalyst herein may contain a transition metal as a catalyst metal. The transition metal may be Ni.

Apparatus Configuration

Figure 1:
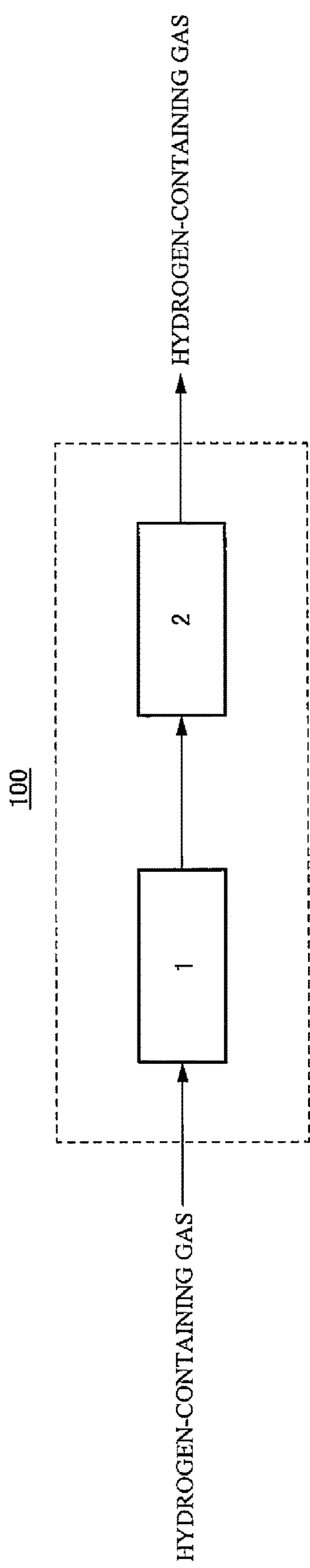
FIG. 1 is a conceptual diagram showing one example of a schematic configuration of a hydrogen purifier according to Embodiment 1.

FIG. 1 is a conceptual diagram showing one example of a schematic configuration of the hydrogen purifier according to Embodiment 1.

In the example shown in FIG. 1, a hydrogen purifier 100 according to the present embodiment includes an ammonia remover 1 and a CO remover 2.

The CO remover 2 reduces carbon monoxide in a hydrogen-containing gas through an oxidation reaction, the hydrogen-containing gas containing ammonia and carbon monoxide. The outer shell of the CO remover 3 may be formed of, for example, a metal such as stainless steel.

The ammonia remover 1 is provided upstream from the CO remover 2, and is configured to cause a reaction between ammonia in the hydrogen-containing gas and oxygen by using a catalyst to decompose the ammonia. The catalyst of the ammonia remover 1 may contain, for example, a transition metal as a catalyst metal. The transition metal may be Ni, for example. One example of such an ammonia remover 1 is a dry ammonia decomposition treatment apparatus disclosed in Japanese Laid-Open Patent Application Publication No. 2010-285595.

It should be noted that, as mentioned above, the hydrogen-containing gas contains at least carbon monoxide and ammonia. Examples of the hydrogen-containing gas include a reformed gas and a water gas.

The hydrogen purifier 100 may include an oxygen-containing gas supply device, which is not shown. In a case where an oxygen-containing gas is mixed in the hydrogen-containing gas in advance, the hydrogen purifier 100 need not include the oxygen-containing gas supply device.

The oxygen-containing gas supply device supplies an oxygen-containing gas to the ammonia remover 1. The oxygen-containing gas supply device may be configured in any form, so long as the oxygen-containing gas supply device is configured to supply an oxygen-containing gas to the ammonia remover 1. The oxygen-containing gas supply device may be configured as a blower, for example.

During use of the ammonia remover 1, heat may be applied to the ammonia remover 1. For example, the heat of a particular area in the fuel cell system where the temperature is increased to a high temperature may be utilized to heat the ammonia remover 1. Examples of the area in the fuel cell system when the temperature is increased to a high temperature include a reformer, a shift converter, a CO remover, and a burner. In a case where a burner is used to heat the ammonia remover 1, the ammonia remover 1 can be heated not only by means of thermal conduction from the burner, but also by means of thermal emission from the burner, thermal conduction from an exhaust gas discharged from the burner, etc. Alternatively, other than the aforementioned devices, a heater or the like provided outside the ammonia remover 1 may be used to heat the ammonia remover 1.

The hydrogen purifier 100 may include a controller, which is not shown. For example, the controller may control the oxygen-containing gas supply device. The controller may be any device, so long as the controller has control functions. The controller includes an arithmetic processing unit (not shown) and a storage unit (not shown) storing control programs. Examples of the arithmetic processing unit include an MPU and CPU. The storage unit is a memory, for example. The controller may be configured as a single controller performing centralized control, or may be configured as a group of multiple controllers performing distributed control in cooperation with each other.

Operations

Hereinafter, one example of operations of the hydrogen purifier 100 according to the present embodiment is described.

In this example, a hydrogen-containing gas supply source, which is not shown, supplies the hydrogen-containing gas to the ammonia remover 1. At the time, the oxygen-containing gas from the oxygen-containing gas supply device may be added to the hydrogen-containing gas. In the ammonia remover 1, ammonia is removed from the hydrogen-containing gas. Thereafter, the hydrogen-containing gas, from which ammonia has been removed, is fed to the CO remover 2 where carbon monoxide is removed from the hydrogen-containing gas. Then, the hydrogen-containing gas is supplied to hydrogen utilizing equipment, which is not shown.

Variation 1

A hydrogen purifier according to Variation 1 may be configured such that the hydrogen purifier according to Embodiment 1 includes: an oxygen-containing gas supply device; a first passage, through which an oxygen-containing gas from the oxygen-containing gas supply device is supplied to the ammonia remover; and a second passage, through which the oxygen-containing gas is supplied to the CO remover.

According to the above configuration, the amount of oxygen-containing gas (the amount of oxygen) supplied to the ammonia remover can be reduced compared to a configuration that includes not both the first and second passages but only the first passage. As a result, an oxidation reaction of hydrogen, which is a side reaction, can be suppressed.

The reason for this is described below.

In a case where the hydrogen purifier includes not both the first and second passages but only the first passage, it is necessary to supply, through the first passage, the oxygen-containing gas containing oxygen in an amount that covers the amount of oxygen to be consumed by the CO remover. Oxygen in the oxygen-containing gas supplied through the first passage is not only used for ammonia removal, but also part of the oxygen is consumed by an oxidation reaction of hydrogen while the oxygen-containing gas passes through the ammonia remover.

The hydrogen purifier according to Variation 1 is configured to supply, through the second passage, the oxygen-containing gas containing oxygen in an amount that covers the amount of oxygen to be consumed by the CO remover. Therefore, the amount of oxygen-containing gas (the amount of oxygen) to be supplied to the ammonia remover through the first passage can be reduced.

Other than the above-described features, the hydrogen purifier according to Variation 1 may be configured in the same manner as the hydrogen purifier according to Embodiment 1.

Apparatus Configuration

Figure 2:
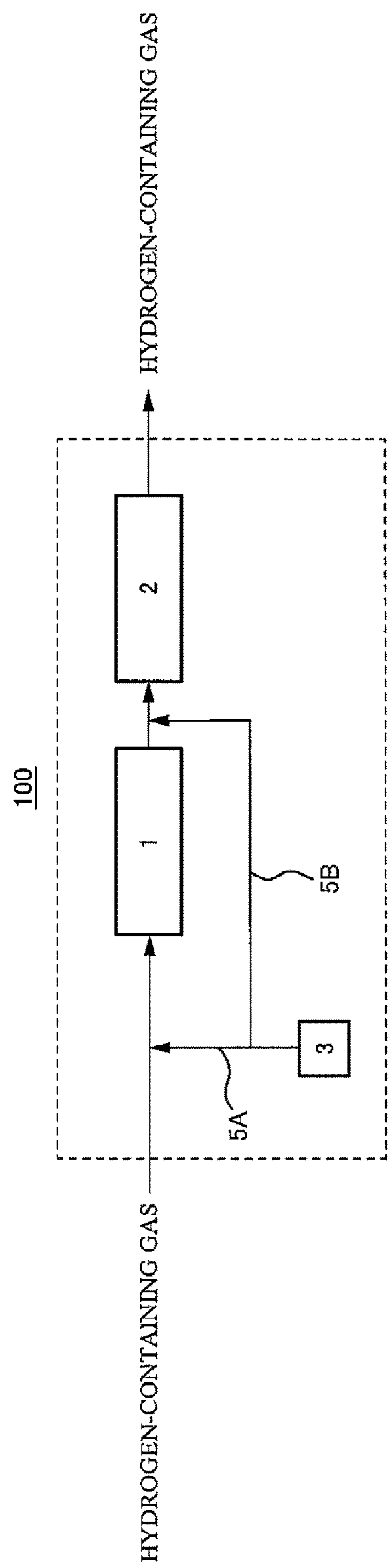
FIG. 2 is a conceptual diagram showing one example of a schematic configuration of a hydrogen purifier according to Variation 1 of Embodiment 1.

FIG. 2 is a conceptual diagram showing one example of a schematic configuration of the hydrogen purifier according to Variation 1 of Embodiment 1.

In the example shown in FIG. 2, the hydrogen purifier 100 according to Variation 1 includes the ammonia remover 1, the CO remover 2, an oxygen-containing gas supply device 3, a first passage 5A, and a second passage 5B.

The ammonia remover 1, the CO remover 2, and the oxygen-containing gas supply device 3 are the same as the ammonia remover 1, the CO remover 2, and the oxygen-containing gas supply device described in Embodiment 1. Therefore, the description of these components is omitted.

The first passage 5A is a passage through which the oxygen-containing gas from the oxygen-containing gas supply device 3 is supplied to the ammonia remover 1.

The second passage 5B is a passage through which the oxygen-containing gas is supplied to the CO remover 2.

It should be noted that, as illustratively shown in FIG. 2, the second passage 5B may be disposed such that the second passage 5B branches off from the first passage 5A, or may be disposed independently of the first passage 5A such that the second passage 5B extends from a separately provided oxygen-containing gas supply device, which is not shown.

Operations

Hereinafter, one example of operations of the hydrogen purifier 100 according to Variation 1 is described.

In this example, the oxygen-containing gas from the oxygen-containing gas supply device 3 is supplied to the ammonia remover 1 through the first passage 5A, and also supplied to the CO remover 2 through the second passage 5B.

Other than the above-described features, the operations of the hydrogen purifier 100 according to Variation 1 may be the same as the operations described in Embodiment 1.

Variation 2

A hydrogen purifier according to Embodiment 2 may be configured such that the hydrogen purifier according to one of Embodiment 1 and Variation 1 of Embodiment 1 includes a shift converter configured to reduce carbon monoxide in the hydrogen-containing gas through a shift reaction. The ammonia remover may be provided downstream from the shift converter.

According to the above configuration, the concentration of carbon monoxide supplied to the CO remover can be reduced, and oxidation of hydrogen due to increase in the amount of oxygen supplied to the CO remover can be suppressed. Moreover, the carbon monoxide concentration in the hydrogen-containing gas after the hydrogen-containing gas has passed through the hydrogen purifier can be reduced.

Other than the above-described features, the hydrogen purifier according to Variation 2 may be configured in the same manner as the hydrogen purifier according to one of Embodiment 1 and Variation 1 of Embodiment 1.

Apparatus Configuration

Figure 3:
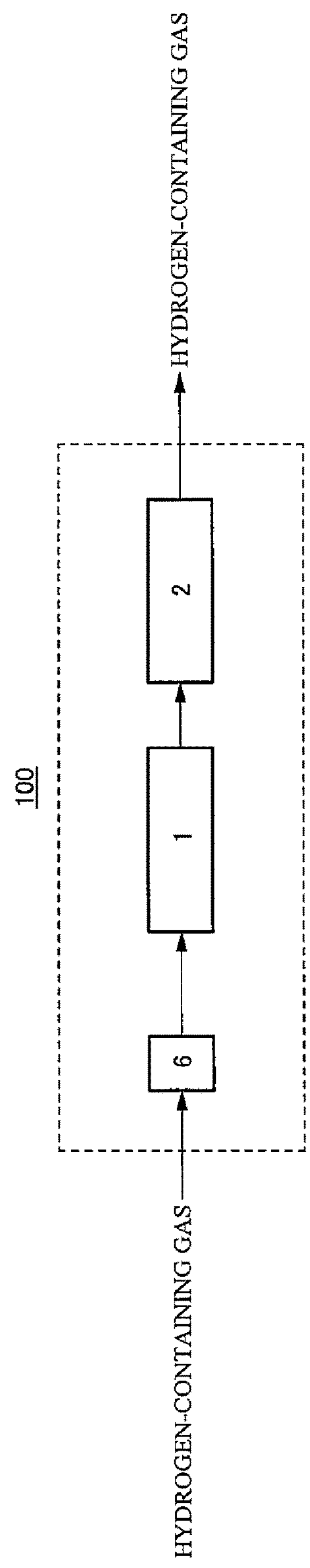
FIG. 3 is a conceptual diagram showing one example of a schematic configuration of a hydrogen purifier according to Variation 2 of Embodiment 1.

FIG. 3 is a conceptual diagram showing one example of a schematic configuration of the hydrogen purifier according to Variation 2 of Embodiment 1.

In the example shown in FIG. 3, the hydrogen purifier 100 according to Variation 2 includes the ammonia remover 1, the CO remover 2, and a shift converter 6.

Since the ammonia remover 1 and the CO remover 2 are the same as those described in Embodiment 1, the description of these components is omitted. Similar to the configuration previously described, the hydrogen purifier 100 according to Variation 2 may include the oxygen-containing gas supply device 3, and/or may include the first and second passages 5A and 5B.

The shift converter 6 reduces carbon monoxide in the hydrogen-containing gas through a shift reaction. The ammonia remover 1 is provided downstream from the shift converter 6.

The outer shell of the shift converter 6 may be formed of, for example, a metal such as stainless steel.

Operations

Hereinafter, one example of operations of the hydrogen purifier 100 according to Variation 2 is described.

In this example, CO in the hydrogen-containing gas is reduced by the shift converter 6, and the hydrogen-containing gas in which CO has been reduced is supplied to the ammonia remover 1.

Other than the above-described features, the operations of the hydrogen purifier 100 according to Variation 2 may be the same as the operations described in one of Embodiment 1 and Variation 1 of Embodiment 1.

Embodiment 2

A hydrogen generation apparatus according to Embodiment 2 includes: the hydrogen purifier according to any one of Embodiment 1, Variation 1 of Embodiment 1, and Variation 2 of Embodiment 1; and a reformer configured to generate the hydrogen-containing gas by using a reaction gas containing a raw material gas. The reaction gas contains at least one of a nitrogen gas and a nitrogen-containing compound.

According to the above configuration, the progress of poisoning by ammonia generated from a nitrogen gas or a nitrogen-containing compound in the reformer can be suppressed compared to conventional hydrogen generation apparatuses.

Other than the above-described features, the hydrogen generation apparatus according to the present embodiment may be configured in the same manner as any hydrogen generation apparatus that includes the hydrogen purifier according to any one of Embodiment 1, Variation 1 of Embodiment 1, and Variation 2 of Embodiment 1.

Apparatus Configuration

Figure 4:
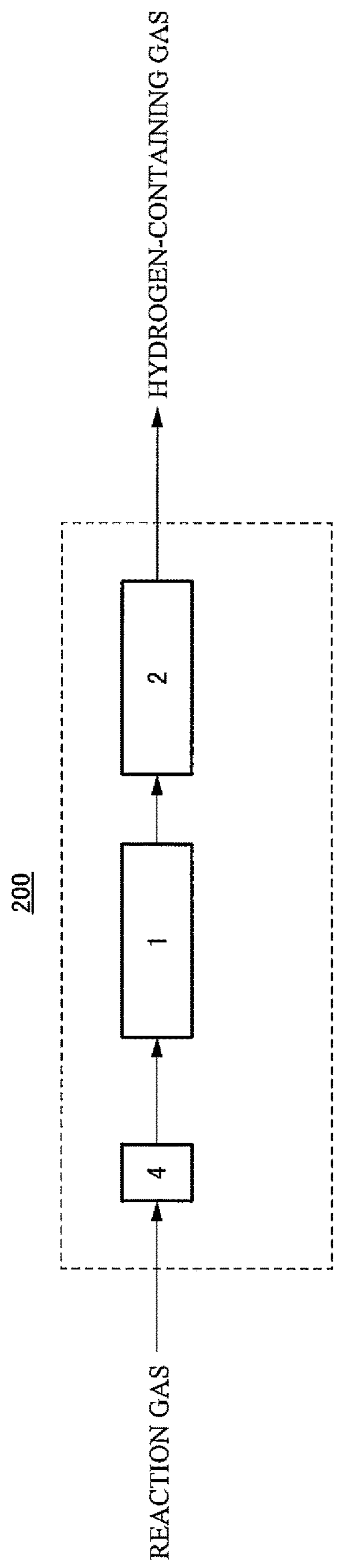
FIG. 4 is a conceptual diagram showing one example of a schematic configuration of a hydrogen generation apparatus according to Embodiment 2.

FIG. 4 is a conceptual diagram showing one example of a schematic configuration of the hydrogen generation apparatus according to Embodiment 2.

In the example shown in FIG. 4, a hydrogen generation apparatus 200 according to the present embodiment includes a reformer 4, the ammonia remover 1, and the CO remover 2.

Since the ammonia remover 1 and the CO remover 2 are the same as those described in Embodiment 1, the description of these components is omitted. Similar to the configurations previously described, the hydrogen generation apparatus 200 according to the present embodiment may include the oxygen-containing gas supply device 3, and/or may include the first and second passages 5A and 5B, and/or may include the shift converter 6.

The reformer 4 generates a hydrogen-containing gas by using a reaction gas containing a raw material gas. To be specific, a reforming reaction of the raw material gas is catalyzed by a reforming catalyst (not shown) in the reformer 4, and thereby the hydrogen-containing gas is generated. The reforming reaction may be any type of reforming reaction. Examples of the reforming reaction include a steam reforming reaction, an autothermal reaction, and a partial oxidation reaction. The hydrogen generation apparatus 200 includes, as necessary, devices required for the reforming reaction although they are not shown in FIG. 4. For example, if the reforming reaction is a steam reforming reaction, the hydrogen generation apparatus 200 includes: a combustor configured to heat the reformer; an evaporator configured to generate steam; and a water supply device configured to supply water to the evaporator. If the reforming reaction is an autothermal reaction, the hydrogen generation apparatus 200 further includes an air supply device (not shown) configured to supply air to the reformer. It should be noted that the raw material gas is a gas containing an organic compound comprised of at least carbon and hydrogen, such as city gas or natural gas containing methane as a main component, or LPG.

Operations

Hereinafter, one example of operations of the hydrogen generation apparatus 200 according to the present embodiment is described.

In this example, the reformer 4 generates the hydrogen-containing gas by using a reaction gas containing the raw material gas.

The operations that the hydrogen generation apparatus 200 according to the present embodiment performs thereafter may be the same as the operations described in any one of Embodiment 1, Variation 1 of Embodiment 1, and Variation 2 of Embodiment 1. Therefore, a detailed description of the operations is omitted.

Embodiment 3

A fuel cell system according to Embodiment 3 includes: the hydrogen generation apparatus according to Embodiment 2; and a fuel cell configured to generate electric power by using the hydrogen-containing gas that is supplied from the hydrogen generation apparatus.

According to the above configuration, the progress of poisoning by ammonia generated from a nitrogen gas or a nitrogen-containing compound in the reformer can be suppressed compared to conventional fuel cell systems.

Other than the above-described features, the fuel cell system according to the present embodiment may be configured in the same manner as any fuel cell system that includes the hydrogen generation apparatus according to Embodiment 2.

Apparatus Configuration

Figure 5:
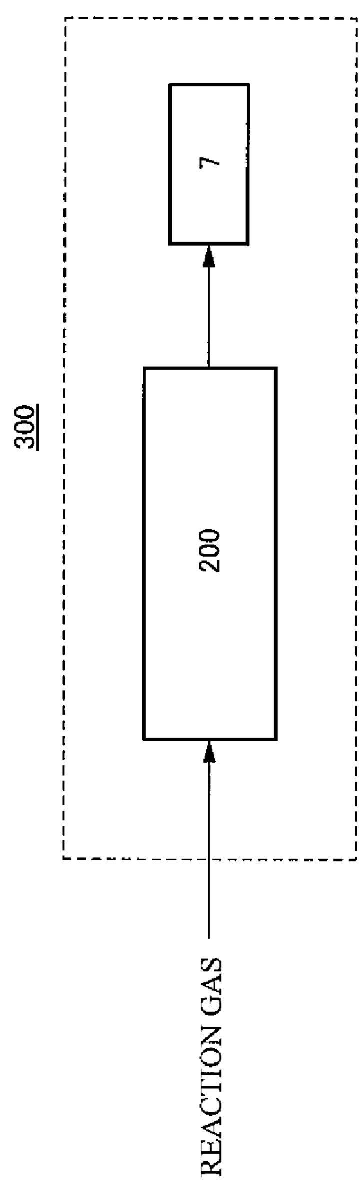
FIG. 5 is a conceptual diagram showing one example of a schematic configuration of a fuel cell system according to Embodiment 3.

FIG. 5 is a conceptual diagram showing one example of a schematic configuration of the fuel cell system according to Embodiment 3.

In the example shown in FIG. 5, a fuel cell system 300 according to the present embodiment includes the hydrogen generation apparatus 200 and a fuel cell 7.

Since the hydrogen generation apparatus 200 according to Embodiment 3 is the same as the hydrogen generation apparatus 200 according to Embodiment 2, the description of the hydrogen generation apparatus 200 according to Embodiment 3 is omitted.

The fuel cell 7 generates electric power by using the hydrogen-containing gas in which carbon monoxide and ammonia have been reduced. The fuel cell 7 may be any type of fuel cell. Examples of the fuel cell 7 include a polymer electrolyte fuel cell, a solid oxide fuel cell, and a phosphoric acid fuel cell.

Operations

Hereinafter, one example of operations of the fuel cell system 300 according to the present embodiment is described.

In this example, during a power generation operation of the fuel cell system 300, the fuel cell 7 generates electric power by using the hydrogen-containing gas in which carbon monoxide and ammonia have been reduced, the hydrogen-containing gas being supplied from the hydrogen generation apparatus 200.

If the fuel cell 7 is seen as hydrogen utilizing equipment, then the operations of the fuel cell system 300 according to the present embodiment may be the same as the operations described in Embodiment 2. Therefore, a detailed description of the operations of the fuel cell system 300 is omitted.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

According to one aspect of the present invention, the progress of poisoning by ammonia can be suppressed compared to conventional art. Therefore, the present invention is applicable to hydrogen purifiers, hydrogen generation apparatuses, and fuel cell systems.

REFERENCE SIGNS LIST

1 ammonia remover
2 CO remover
3 oxygen-containing gas supply device
4 reformer
5A first passage
5B second passage
6 shift converter
7 fuel cell
100 hydrogen purifier
200 hydrogen generation apparatus
300 fuel cell system

The invention claimed is:

1. A hydrogen purifier comprising:

a CO remover that reduces carbon monoxide in a hydrogen-containing gas through an oxidation reaction, the hydrogen-containing gas containing ammonia and carbon monoxide;

an ammonia remover provided upstream from the CO remover and that causes a reaction between ammonia in the hydrogen-containing gas and oxygen by using a catalyst to decompose the ammonia;

an oxygen-containing gas supply device;

a first passage, through which an oxygen-containing gas from the oxygen-containing gas supply device is supplied to the ammonia remover; and a second passage, through which the oxygen-containing gas is supplied to the CO remover.

2. The hydrogen purifier according to claim 1, wherein the catalyst contains a transition metal as a catalyst metal.

3. The hydrogen purifier according to claim 2, wherein the transition metal is Ni.

4. The hydrogen purifier according to claim 1, comprising a shift converter configured to reduce carbon monoxide in the hydrogen-containing gas through a shift reaction, wherein the ammonia remover is provided downstream from the shift converter.

5. A hydrogen generation apparatus comprising:

the hydrogen purifier according to claim 1; and a reformer configured to generate the hydrogen-containing gas by using a reaction gas containing a raw material gas, wherein the reaction gas contains at least one of a nitrogen gas and a nitrogen-containing compound.

6. A fuel cell system comprising:

the hydrogen generation apparatus according to claim 5; and a fuel cell configured to generate electric power by using the hydrogen-containing gas that is supplied from the hydrogen generation apparatus.

* * * * *